US006816872B1

(12) United States Patent
Squibb

(10) Patent No.: US 6,816,872 B1
(45) Date of Patent: *Nov. 9, 2004

(54) APPARATUS AND METHOD FOR RECONSTRUCTING A FILE FROM A DIFFERENCE SIGNATURE AND AN ORIGINAL FILE

(75) Inventor: Mark Squibb, Kingston, NY (US)

(73) Assignee: TimeSpring Software Corporation, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 08/504,562

(22) Filed: Jul. 20, 1995

Related U.S. Application Data

(63) Continuation of application No. 08/039,702, filed on Mar. 30, 1993, now Pat. No. 5,479,654, which is a continuation of application No. 07/515,164, filed on Apr. 26, 1990, now abandoned.

(51) Int. Cl.[7] .......................... G06F 12/00; G06F 17/30; G06F 15/00; G06F 17/00

(52) U.S. Cl. ...................................... 707/200; 715/511

(58) Field of Search ............................... 395/200, 600; 715/511; 707/200

(56) References Cited

U.S. PATENT DOCUMENTS

| 3,711,863 A | 1/1973 | Bloom |
| 3,715,734 A | 2/1973 | Fajans |
| 4,053,871 A * | 10/1977 | Vidalin et al. ........... 340/146.2 |
| 4,315,310 A | 2/1982 | Baylis et al. |
| 4,399,395 A | 8/1983 | Espelage |

(List continued on next page.)

FOREIGN PATENT DOCUMENTS

JP   63305439   * 12/1988

OTHER PUBLICATIONS

Madej, Tom; "An Application of Group Testing to the File Comparison Problem" IEEE 1989, pp. 237–243.*

(List continued on next page.)

*Primary Examiner*—Kevin J. Teska
*Assistant Examiner*—Dwin M. Craig
(74) *Attorney, Agent, or Firm*—Baker & McKenzie

(57) ABSTRACT

Invention maintains duplicate files in safe places. A SCAN computer program creates a TOKEN Table of an earlier file. The TOKEN Table reflects the indices of successive segments of the file and the exclusive-or (XR) and Cyclic redundancy check (CRC) products of the characters in each segment. An updated file is compared to the earlier file by comparing the XR and CRC products of segments in the updated file to the XR and CRC products in the TOKEN Table. On detecting matching products for identical segments, the next segments are compared. On mismatch, the segment (window) for the updated file is bumped one character and new XR and CRC products generated and compared. The indices of the TOKEN Table and the offsets from the start of the file of the first characters of the updated file matching segments are set forth in a Match Table. Next the updated file is scrolled through for the non-matching information determined by acting on the indices and offsets of the Match Table to form the TRANSITION Table which is the Match Table and the updated file non-matching information. The TRANSITION Table contains the delta information which may be sent to another location having a copy of the earlier file thereat: the whole updated file need not be sent there. A reconstruction program at the location looks at the TRANSITION Table to determine where to get the characters for the copy of the updated file it is creating.

80 Claims, 11 Drawing Sheets

U.S. PATENT DOCUMENTS

| | | |
|---|---|---|
| 4,491,934 A | 1/1985 | Heinz |
| 4,513,379 A | 4/1985 | Wilson et al. |
| 4,558,302 A | 12/1985 | Welch |
| 4,561,659 A | 12/1985 | Redfield et al. |
| 4,583,185 A | 4/1986 | Heartz |
| 4,589,066 A | 5/1986 | Lam et al. |
| 4,593,553 A | 6/1986 | Bonitz et al. |
| 4,627,057 A | 12/1986 | Schmidt et al. |
| 4,641,274 A | 2/1987 | Swank |
| 4,651,146 A | 3/1987 | Lucash et al. |
| 4,653,020 A | 3/1987 | Cheselka et al. |
| 4,727,544 A | 2/1988 | Brunner et al. |
| 4,738,451 A | 4/1988 | Logg |
| 4,742,528 A | 5/1988 | Stenzel |
| 4,743,818 A | 5/1988 | Quayle et al. |
| 4,761,642 A | 8/1988 | Huntzinger |
| 4,787,030 A | 11/1988 | Harter et al. |
| 4,807,182 A | 2/1989 | Queen |
| 4,825,050 A | 4/1989 | Griffith et al. |
| 4,845,645 A | 7/1989 | Matin et al. |
| 4,852,168 A | 7/1989 | Sprague |
| 4,859,995 A | 8/1989 | Hansen et al. |
| 4,881,075 A | 11/1989 | Weng |
| 5,051,947 A | 9/1991 | Messenger et al. |
| 5,113,354 A * | 5/1992 | Harper et al. ............... 364/514 |

OTHER PUBLICATIONS

Vitter, Jeffery Scott; "Implementations for Coalesced Hashing" ACM 1982, pp. 911–926.*

Graham S.L., Rivest R.L.; "A Technique for Isolating Differences Between Files" ACM 1978, pp. 264–268.*

Croft, Bruce W., Savino, Pasquale; "Implementing Ranking Strategies Using Text Signatures", ACM 1988, pp. 42–62.*

Metzner, J. John, A Parity Stucture For Large Remotely Located Replicated Data Files, IEEE Trans. On Comp., vol. C32, No. 8 8/83 pp 727–730.*

*Data Compression via Textual Substitution*, James A. Storer and Thomas G. Szymanski, Journal of the Association for Computing Machinery, vol. 29, No. 4, Oct. 1982, pp. 928–951.

Karp, Richard M. et al., *Efficient Randomized Pattern–Matching Algorithms*, IBM J. Res Develop vol. 31 No. 2 Mar. 1987.

2 information sheets on diff(C) function in Unix.

Sarwate, Computation of Cyclic Redundancy Checks VIA Table Look–Up, Communications of the ACM, 8/88 V31 No. 8 p. 1008(b).

Ramabadran et al., A Tutorial on CRC Computations, IEEE Micro, 8/88, vol. 8 issue 4.

Les Trachtman, "Patent Claims Search" for Colinear Systems dated Feb. 7, 1990.

* cited by examiner

FIG. 2

```
  0     1    2     3
  1     1    1     1      1
  THIS  IS   A TEST FILE.
```

FIG. 3

```
  1     1    1          1     1
  THIS  IS   A RADICAL  TEST  FILE.      1
```

FIG. 4
TOKEN TABLE

| INDEX | XR PROD | CRC 16-BIT PROD | CRC 32-BIT PROD |
|-------|---------|-----------------|-----------------|
| 0     | XR0     | CRC0            | CRC0            |
| 1     | XR1     | CRC1            | CRC1            |
| 2     | XR2     | CRC2            | CRC2            |
| 3     | XR3     | CRC3            | CRC3            |

FIG. 5
MATCH TABLE

| E.F. INDEX | U.F. OFFSET |
|------------|-------------|
| 0          | 0           |
| 1          | 5           |
| 2          | 18          |
| 3          | 23          |

FIG. 6
TRANSITION TABLE (IB FORMAT)

| E.F. INDEX | U.F. OFFSET | ADJUSTMENT |
|---|---|---|
| 0 | 0 | |
| 1 | 5 | |
| 2 | 18 | "RADICAL" |
| 3 | 23 | |

FIG. 11
MATCH TABLE

| E.F. INDEX | U.F. OFFSET | EXTENT |
|---|---|---|
| 0 | 0 | 2 |
| 2 | 18 | 2 |

FIG. 12
TRANSITION TABLE (IBE FORMAT)

| E.F. INDEX | U.F. OFFSET | END | ADJUSTMENT |
|---|---|---|---|
| 0 | 0 | 9 | |
| 2 | 18 | 23 | "RADICAL" |

FIG. 13
TRANSITION TABLE (IBC FORMAT)

| E.F. INDEX | U.F. OFFSET | COUNT | ADJUSTMENT |
|---|---|---|---|
| 0 | 0 | 2 | |
| 3 | 18 | 2 | "RADICAL" |

US 6,816,872 B1

APPARATUS AND METHOD FOR RECONSTRUCTING A FILE FROM A DIFFERENCE SIGNATURE AND AN ORIGINAL FILE

This application is a continuation of application Ser. No. 08/039,702, filed Mar. 30, 1993, now U.S. Pat. No. 5,479,654, which is a continuation of application Ser. No. 07/515,164, filed Apr. 26, 1990, now abandoned.

BACKGROUND OF THE INVENTION

1. Field of the Invention

This invention relates to techniques for representing file differences useful in computer file protect systems and other systems, and more particularly to file transfer techniques useful in an electronic data backup system wherein only changes in a file are periodically sent to the backup system and in other systems.

2. Discussion of Prior Information

It is well known to off-load computers at the end of a work day to secure the data file against computer failure. It is also known to transmit the file to an off-site location for additional file security.

What is not known is the generation of a set of representations of the changes in a file, and the periodic relocation of that set of representations and its use to update the previous version of the file.

SUMMARY OF THE INVENTION

Accordingly it is an object of the invention to generate a set of representations of the changes made in a computer file during a period of time.

Another object of the invention is to generate a set of representatives of the changes made in a computer file which can be used to update an earlier version of the file, or to create a previous version of an updated file.

Still another object of the invention is to generate and to use such a set of representations in a cost and time effective manner.

The objects of the invention are achieved through computer programs designed to run on a micro- and mini-computers. A first or SCAN program is designed to create a TOKEN Table (or file signature) of mathematical representations of segments of the file as it exists at the start of a period (earlier file (EF)). The TOKEN Table reflects the indices (ordinal numbers) for all of the segments in the earlier file, and the exclusive-or (XR) and cyclic redundancy check (CRC) products of the set of characters for each segment. Actually, two CRC products are generated for each segment; a sixteen bit one and a thirty-two bit one. The three products, XR and two CRC, are generated for speed in comparisons: the XR product is first compared because it is the fastest comparison; then the slower sixteen bit CRC one if necessary; and finally the still slower thirty-two bit CRC if necessary.

A second program is used at the end of the period to create a MATCH Table setting forth the location of segments in the current file that are identical to those in the earlier file. The MATCH Table lists the indices of all of the segments in the earlier file and the file offsets of the first character of the corresponding identical segment in the updated file. The second program calculates the mathematical representations of the first segment (window) in the updated, revised or current file, first calculating only the XR product and comparing it to the XR product for the first earlier-file segment in the TOKEN Table and noting whether a match exists. If so, it then calculates the sixteen bit CRC product and compares it to the sixteen bit early file CRC product and notes whether a match exists; if so, it finally calculates the more time consuming but more reliable thirty-two bit CRC product and compares it to the thirty-two early file CRC product and notes whether a match exists; and if so, makes an index and offset entry in the MATCH Table for the identical segments; the offset entry being the ordinal number of the first character in the current file segment string of characters. (The earlier file segments are numbered (indexed) sequentially.). If a segment match is obtained, the second program calculates one or more mathematical representations for the next segment in the current file, and compares them to the products associated with the next index in the TOKEN Table and representing the second segment of the earlier file. However, if a mismatch obtained, the window (which retains segment size) is bumped along one character, new product(s) calculated for the window characters and comparison(s) again made with the same representations of the earlier file segments in the TOKEN Table. This continues until a match obtains at which time the index for the earlier file segment and the offset of the first character in the nonmatching current file window (segment) are recorded in the MATCH Table. The process then continues as above to the end of the current file. Only the XR product is calculated in the event of an XR product mismatch; the sixteen bit and the thirty-two bit CRC products being generated respectively only in the event of earlier matches of the XR and sixteen bit CRC products.

A third program creates a TRANSITION Table that reflects what's in the current file that's not in the earlier table, and where. It scrolls through the list of indices and offsets in the MATCH Table, to see if each offset number differs from the previous one by the segment size. When such an offset differs from the previous one by more than the segment size, it adds the segment size to the first offset to determine the file ordinal number of the first character in the matching information, subtracts one from the second offset to determine the last character, goes to the current file and lifts therefrom that set of characters beginning with that ordinal number and stopping with the character preceding the extra-spaced offset, and adds them to the MATCH Table to create with the index a TRANSITION Table.

Thus creation of the Transition Table involves assuring that every character in current file is accounted for in the TRANSITION Table. The MATCH Table provides all of the information necessary for this accounting. Each entry in the beginning column represents a match in the early file of segment characters to the current file characters at location beginning. The matching segment in the early file is located at that offset, which is equal to the index times the segment size in early file.

Essentially the same process is followed for a deletion. The second program, if no match obtained for an earlier file segment by the end of the updated file (or over a predetermined number of segments as conditioned by the character of the file), would have proceeded to endeavor to match the next index mathematical representations in the TOKEN Table with a current file segment, with no offset entry having been made in the MATCH Table for the index of the segment that was unmatched. On proceeding with the index and representations of the next earlier-file segment, the window of the current file would be bumped along, and the index and offset number entered in the MATCH Table when the match of the mathematical representations occurred. The third program on scrolling through the MATCH Table offsets, notes the missing offset, notes the preceding offset, adds the segment size to the previous offset and copies from that number forward the reduced characters if any in the current file before the next offset, into the TRANSITION Table and in association with the index number of the unmatched segment.

The TRANSITION Table is used to update a copy of the earlier file. Typically, a fourth program and the earlier version of the file are on an off-site location and the TRANSITION Table representations are electronically transmitted thereto. The fourth program will examine the indexes and offsets of the TRANSITION Table, copying segments from the earlier file where the succeeding offset just differs by the segment size, into what is to be a duplicate version of the updated file, making additions where the offset numbers differ from the preceding ones by more than the segment size with the information provided in the TRANSITION Table, and substitutions from the TRANSITION Table where the offset numbers are missing.

As observed earlier, the TOKEN Table mathematical representations of file segments may be the products of exclusive-oring of the characters in successive earlier file segments and of generating two cyclic redundancy check (CRC) products for each earlier file segment. Corresponding XR products are most quickly generated, but do not detect character order differentiating; a sixteen bit CRC will catch most of these transpositions; a relatively slowly generated thirty-two bit CRC product will detect essentially all of them.

As observed earlier the MATCH Table is generated by the second program generating mathematical representations of the segment sized windows of the current file, and comparing the representations of a window with an index's associated mathematical representations in the TOKEN Table. As long as matches obtain, successive window sized segments of the current file are addressed and a MATCH Table listing reflecting the early file segment index and the current segment first character offset is generated. Normally three mathematical representations of each segment obtain—an exclusive-or (XR) one and sixteen bit and thirty-two bit cyclic redundancy check (CRC) ones. In the interests of speed, the XR products are compared first, and if a mismatch occurs in them, it is clear that the segments are unmatched. However, even if the XR products match, the segments may not match because the XR operation is not sensitive to the transposition of characters. Accordingly, it is also necessary on XR match, to compare the sixteen bit CRC product. On sixteen bit CRC match, it is desirable to do a thirty-two bit CRC match for most applications to achieve practically one hundred percent certainty. The generation of the CRC product is a relatively slow process and is avoided where possible as on XR mismatch. However, the great benefit of avoiding CRC calculations occurs in operations subsequent to segment mismatch.

As observed earlier, upon detection of a mismatch, a segment sized window representing only a one character displacement of the window in the current file is operated upon to determine its mathematical representations and compare them with the representations of the just compared TOKEN Table representations, then on mismatch upon successor windows until a match obtains or the end of file is reached. By generating first the quickly generated exclusive-or (XR) products, and only on match generating the more slowly generated CRC products, a significant amount of time can be saved.

Applicant has further discovered that even the exclusive-oring process can be expedited on a one-character shift of the window under consideration. Thus the new XR product need not involve the exclusive-oring of each of the characters of the new window: rather only the exiting character and the entering character need be exclusive-ored with the existing XR product of the just tested segment. The second exclusive-oring of the exiting character amounts to a subtraction of it from the segment product.

Another feature of the invention is that the amount of updating material that must be transmitted to the off-site is minimal; normally being less than five percent (5%) of the current file.

An advantage of the invention is that it provides an easy way to secure a user's data from fire, theft and tampering.

Another advantage is that is provides an inexpensive disaster recovery insurance.

A further advantage is that it eliminates the tedious chore of computer backup, and allows the user's office time to be dedicated more fully to the productivity and profitability of his or her business.

Yet another advantage of the invention is that programs embodying the invention can be incorporated in larger programs for handling large model files which are immune to character insertions and deletions and grow in size to accommodate new records. Thus under certain circumstances, it is possible to skip creation of MATCH and TRANSITION Tables by windowing techniques.

BRIEF DESCRIPTION OF THE DRAWINGS

These and other objects, features, and advantages of the invention will become apparent from a reading of the following specification when considered with the appended drawings wherein:

FIG. 2 is a representation of the contents of a user's earlier file;

FIG. 3 is a representation of the contents of the user's updated file;

FIG. 4 sets forth a TOKEN Table which consists of the indices and the exclusive-or (XR) and cyclic redundancy check (CRC) products of successive segments of the earlier program;

FIG. 5 sets forth a MATCH Table reflecting a comparison of the TOKEN Table contents with the identical segments of the current program;

FIG. 6 sets forth a TRANSITION Table reflecting the differences in the two files of FIGS. 2 and 3;

FIG. 11 sets forth a MATCH Table having an alternate format to that of FIG. 5;

FIG. 12 sets forth a TRANSITION Table having an alternate (IBE) format; and

FIG. 13 sets forth a TRANSITION Table heaving another (IBC) format.

DETAILED DESCRIPTION OF EMBODIMENT

Figure 1:
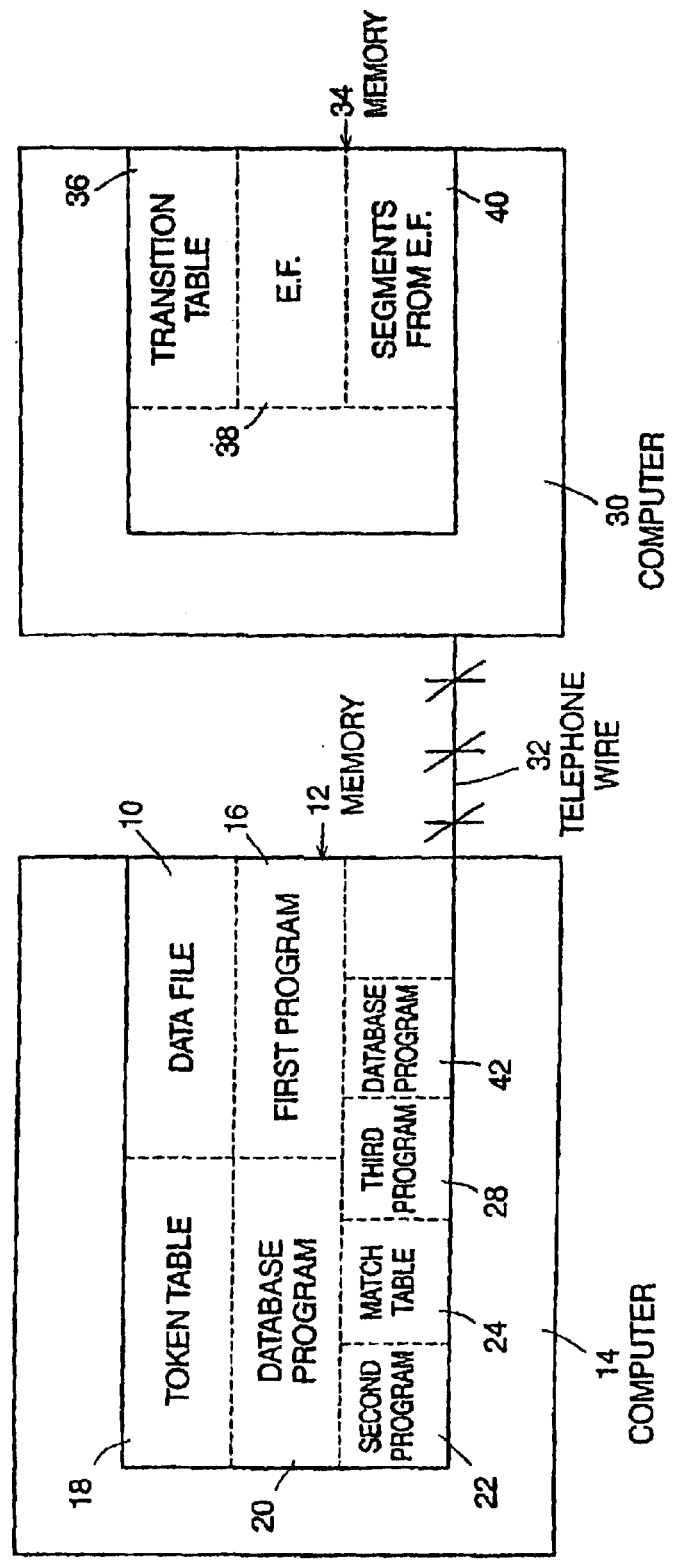
FIG. 1 is a diagram of a system according to the invention.

The system concept of the invention is shown in FIG. 1. A user maintaining a data file 10 (FIGS. 1 and 2) such as "This is a test file." in a memory generally indicated by the number 12 of a computer 14, would at the start of the workday, activate a first program 16 (FIG. 7) also in the computer memory to partition the earlier file into five characters segments, generate XR and CRC products for each segment, and list each segment by its index (ordinal number) and its products in a TOKEN Table 18 (FIGS. 1 and 4) in the memory 12 and that he might care to store for the workday on a disk drive (not shown) to maximize available memory space. During the day, the user would update, as by inserting the word "radical", the file 10 so that it reads "This is a radical test file." (FIG. 3), using a conventional data base program 20 also in the memory. At the end of the workday, the user would activate a second program 22 (FIG. 8), then located in the memory 12, to create in the memory 12 a MATCH Table 24 (FIGS. 1 and 5) consisting of indices from the TOKEN Table and the offsets of the first characters of segments (windows) of the updated file that result from the matching of the exclusive-or (XR) and cyclic redundancy check (CRC) products of updated file segments with the products associated with the indices.

The third program 28 in the memory 12 (FIG. 9) works in conjunction with the MATCH Table (or "difference signature") to develop the TRANSITION Table (or "difference signature") which succinctly defines what is or is not in the current file that was not or was in the earlier file. It does this by scrolling through the offsets in the MATCH Table. It looks at the offsets for successive indices, checking to see if it differs from the previous offset by the segment size. When it doesn't, it copies the current file material between the end of the last segment and the start of the segment with the greater than segment size offset, into the TRANSITION Table, there to be associated with the index of the greater than segment size offset.

It results that the TRANSITION Table reflects the changes obtaining in the current program over the earlier file.

The TRANSITION Table is then electronically sent, using conventional modems and communication programs, to the off-site computer 30 over telephone wire 32. Computer 30 has a memory generally indicated by the number 34 which receives the TRANSITION Table in section 36. The earlier file would normally already be resident in section 38 of the memory 34, representing the file as it was updated at the end of the previous day. The fourth program (FIG. 10) creates a duplicate of the current file by inserting or deleting information according to the dictates of the TRANSITION Table in memory section 36 and the contents of the earlier file in memory section 38. As long as the offsets for successive indices differ by the segment size, the program copies the segments for the indices from the earlier file into the memory section 40. When an addition is indicated as at index 2 because the offset figure (18) is larger than the normal segment size (5) over the previous offset figure (5), the fourth program looks for the additional information (here "radical") in the related area of the TRANSITION Table and inserts it in the duplicate file, after the tenth character (number 9). The fourth program then continues reviewing the TRANSITION Table and copying from the earlier file until another non-segment-size-distant offset (here none) is detected.

The TOKEN Table 18 (FIGS. 1 and 4) is created by the first program 16 (FIG. 7) first partitioning the earlier file into fixed sized segments (here five characters) and then generating a mathematical representation for each segment by first creating an exclusive-or (XR) hash product of the characters of each earlier file segment, and then creating a cyclic redundancy check (CRC) product of the characters of each of the segments. Characters of a segment are normally represented by bytes of eight binary bits each, which bytes are exclusive-ored in turn, the first two being exclusived-ored and then that product with the byte of the next character, and so on until the last character (here the fifth) has been exclusive-ored, and the product (exclusive-or hash) stored in the TOKEN Table 18 with the associated index.

Mathematical operations other than exclusive-oring, such as checksum may be employed, but exclusive-oring is the fastest.

Since the exclusive-oring operation is not character order definitive, a second mathematical operation (here cyclic redundancy check (CRC)) is performed by the first program on each segment and recorded in the TOKEN Table with the associated index. There are many polynomials for generating CRCs: applicant incorporates in the first program the thirty-two bit ANSI X. 3.66 CRC Checksum files that appear in FIPS PUB 71 and in FED-STD-1003, to generate the CRC entry for each index in the TOKEN Table (FIG. 4).

As CRC calculations for CRC products are very slow compared to those for XR products, it may be desirable to increase the reliability of the XR product(s). Reliability may be increased by generating intermediate XR products, such as the XR product of half of the characters in a segment. Thus given a series of arbitrarily assigned binary terms for the various characters as indicated below, with segment size equal eight, quarter and half products may be generated respectively and are shown in the right hand columns, the underlining in the more leftward columns indicating where the products are taken:

| character | binary | XR (Quarters) | | XR half | |
|---|---|---|---|---|---|
| T | 01100110 (C0) | | (Q0) | | |
| H | 00110110 (C1) | 01010000 | | | |
| I | 01010101 (C2) | | (Q1) | | (H0) |
| S | 10110111 (C3) | 11100010 | | 10110010 | |
| _ | 00010000 (C4) | | (Q2) | | |
| i | 01010101 (C5) | 01000101 | | | |
| s | 10110111 (C6) | | (Q3) | | (H1) |
| _ | 00010000 (C7) | 010100111 | | 11100010 | |
| XR (seg.) | 01010000 | 01010000 | | 01010000 | |

The segment "This_is_" may be divided into one or more equal sized parts (excepting perhaps the last to accommodate an odd segment size). In this example four separate terms are used. (Each subterm, during nonmatching window operations, may be adjusted by x-oring out the exiting character and x-oring in the incoming character.)

The quarter terms may be combined in any order or fashion. The following expressions are equivalent:

$$XR \text{ (segment)} = C0 \wedge C1 \wedge C2 \wedge C3 \wedge C4 \wedge C5 \wedge C6 \wedge C7$$
$$= Q0 \wedge Q1 \wedge Q2 \wedge Q3$$
$$= H0 \wedge H1, \text{ where "} \wedge \text{"} = XR \text{ operation}$$

Therefore the XR product Term may be expanded to include more information than the XR segment carries without sacrificing the runtime speed advantage of the XR window technique.

The following expressions represent combinational variations of the above rules which, in the context of this invention may be used to provide additional effeciency benefits:

Whereas the Regular XR (segment) product term is the XR sum of C[0–7]=Q[0–3]=H[0–1], subterms (Q and H . . . ) may be introduced to add precision (quality) to the XR test.

The quality of the XR test is important. The runtime efficency of the engine depends upon 1) the quality of the XR test; a more precise XR test solution will cause less frequent fallback to the more expensive CRC tests; and 2) the efficiency with which the XR tests can be implemented as related to standard processor architecture.

Currently supported processor environments favor a two term XR test:

| | (8 bit) | (8 bit) | | |
|---|---|---|---|---|
| Specifically: | XR (segment & H (0) | → | 16 bits. |

Using just a standard XR test (8 bits), a false compare with random data permits a CRC hit (1:[2 to 8th=256]) times. By including a single subterm (HO) this ratio is increased to (1:[65636=2 to 16th]), thereby saving considerable CPU resources. Given more robust computer processing units, more subterms may be included to further enhance performance and reliability.

If sufficient terms are included, the reliability of the XR product or test may be enhanced sufficiently such that the stringent requirements for the CRC tests may be relaxed and the minimum reliability requirements achieved in a more time effective manner.

Figure 7:
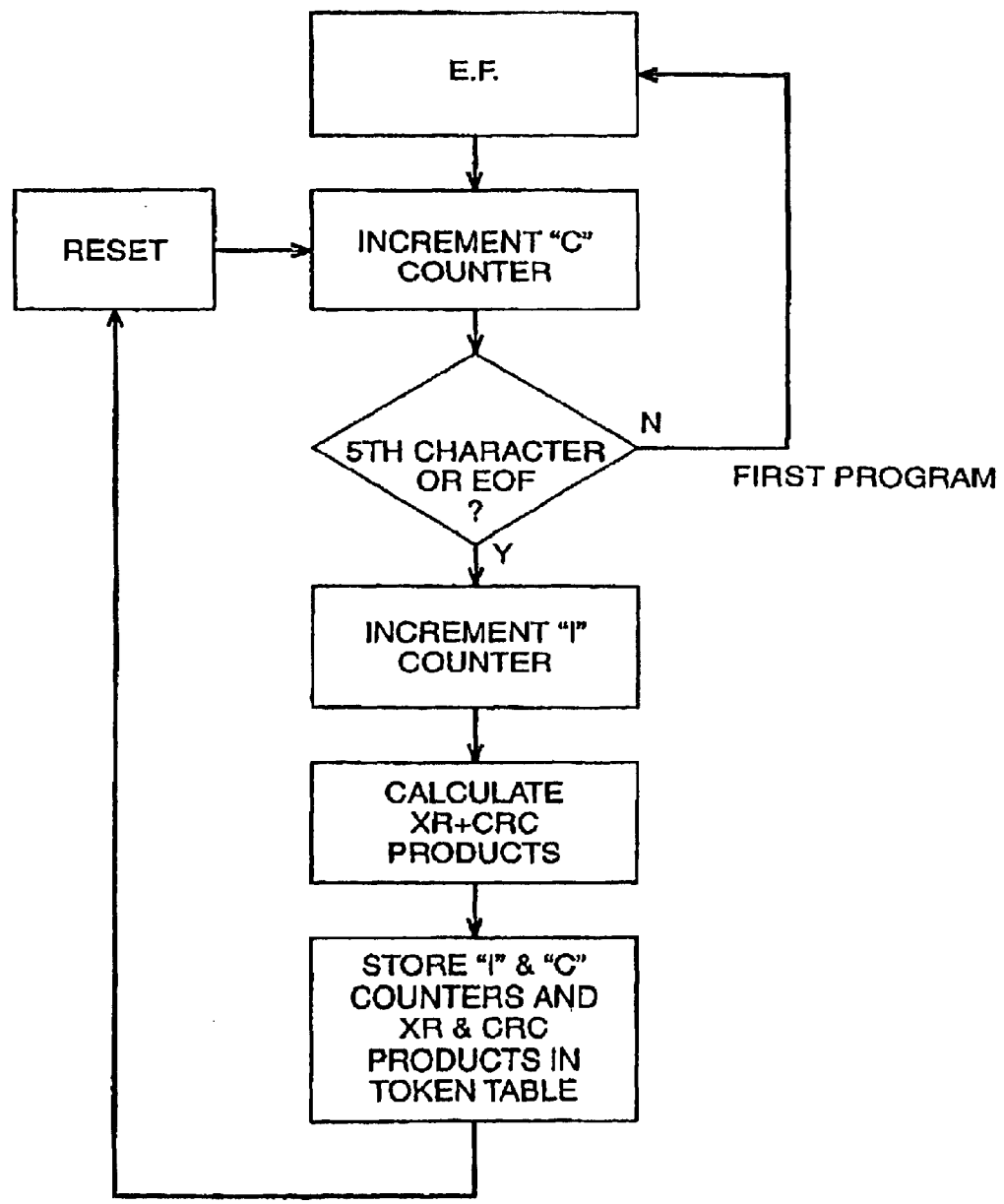
FIG. 7 is a flow chart setting forth the method of the first or TOKEN Table generating program.

The flow chart of FIG. 7 details the operation of the first program. Characters are read from the earlier file EF and when the fifth character is encountered, an index counter is incremented, the XR and CRC products calculated, the index counter contents and products stored in the TOKEN Table, and the character counter reset.

Once the TOKEN Table has been created, the file 10 is opened for updating. In the example of this application, the earlier file "This is a test file" (FIG. 2) is updated, using conventional data base program in memory section 42, with the word radical followed by a space to read "This is a radical test file." (FIG. 3), and this is assumed to be its status at the end of the workday.

The second program 22 (FIG. 2) is actuated to begin the creation of the MATCH Table (FIG. 5) at day's end. It generates mathematical representations of similarly sized segments (windows) of the updated program and compares them to those of the earlier program in the TOKEN Table. Thus, the first segment of the five characters in the updated file would have its exclusive-or and CRC products compared to those in the TOKEN Table of the first segment of the earlier file, and if found equal as they should be in the examples since the identical characters and order obtain in each, the index "0" indicating the first earlier file segment and the offset "0" indicating that the first character in the identical segment in the updated file is the first character in the updated file, are recorded in the MATCH Table. In the examples, the second segments should be found equal, too, and the index "1" and offset "5" recorded. On the third segment, a mismatch of the exclusive-or, and if not, the CRC products should obtain as the segments being compared have the characters "test" and "radic", respectively. Accordingly, the second program increments as the next updated-file segment to be mathematically treated (that is, advances or bumps the updated-file window of consideration, here five characters), one character forward and here involving the updated-file characters "adica". When compared to the mathematical representations of the number 2 segment of the earlier file, a mismatch should again be detected. The program then repeats the operation on succeeding segment windows spaced one character until a match obtains, here involving the third file segment containing the characters "test". The index "2" and the offset "18" are recorded in the MATCH Table The representations of the next segments, of the updated file would match those in the TOKEN Table for the index "3" and hence the index "3" and offset "23" would be entered in the MATCH Table and a suitable end of the file signal noted to end further segment search.

Figure 8:
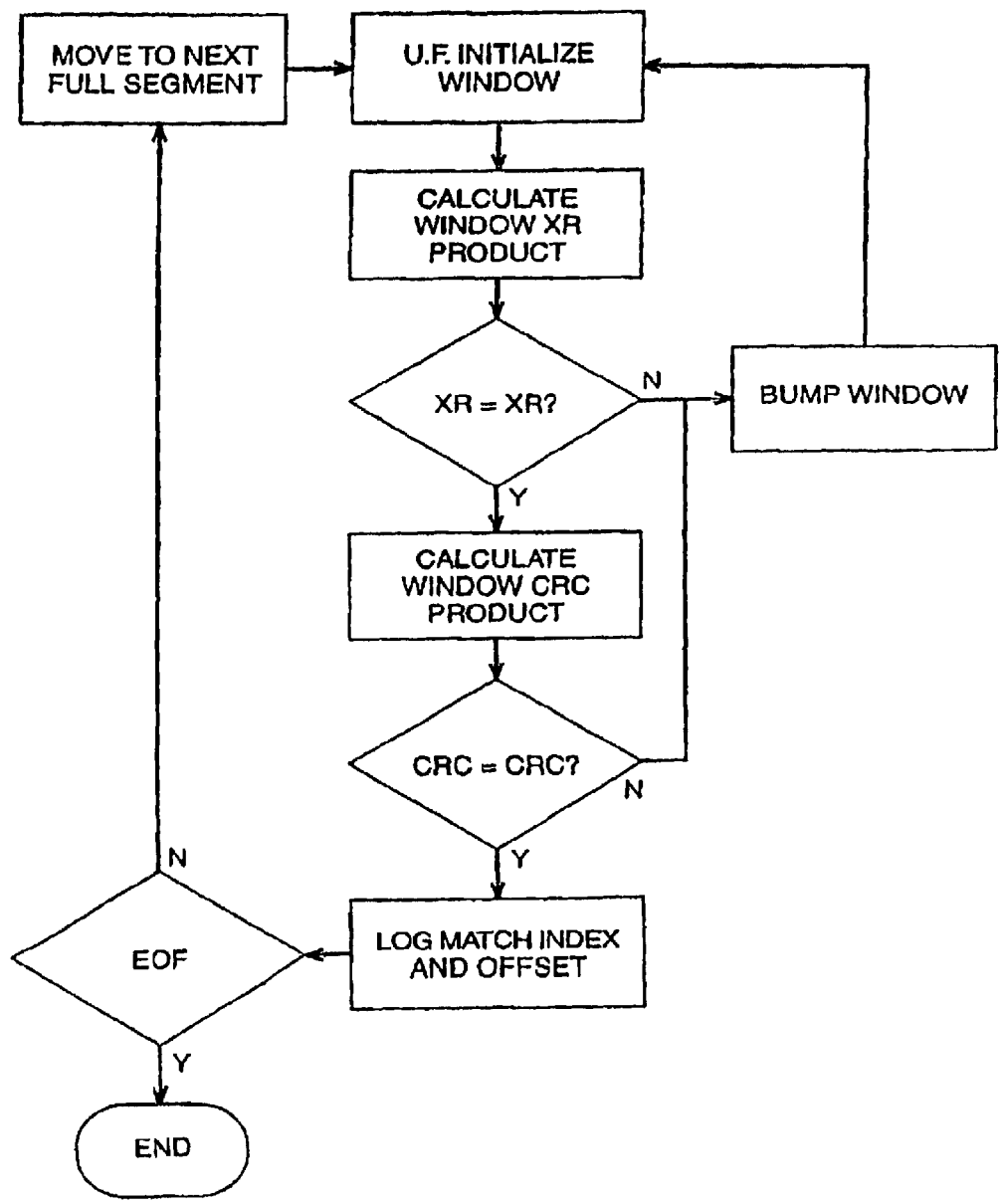
FIG. 8 is a flow chart setting forth the method of the second or MATCH Table generating program.

The flow chart of FIG. 8 details the operation of the second program. The program looks at the first segment (window) of the updated file, calculates the XR product, compares it to the XR product for the first index in the TOKEN Table, and if no match obtains, bumps the window to repeat the process. If an XR match obtains, it calculates the CRC product and compares it to the CRC product for the index in the TOKEN Table. If a match obtains, the index and the file offset of the first character in the updated file are recorded in the MATCH Table and the window of consideration for the second file shifted one full segment.

Figure 8A:
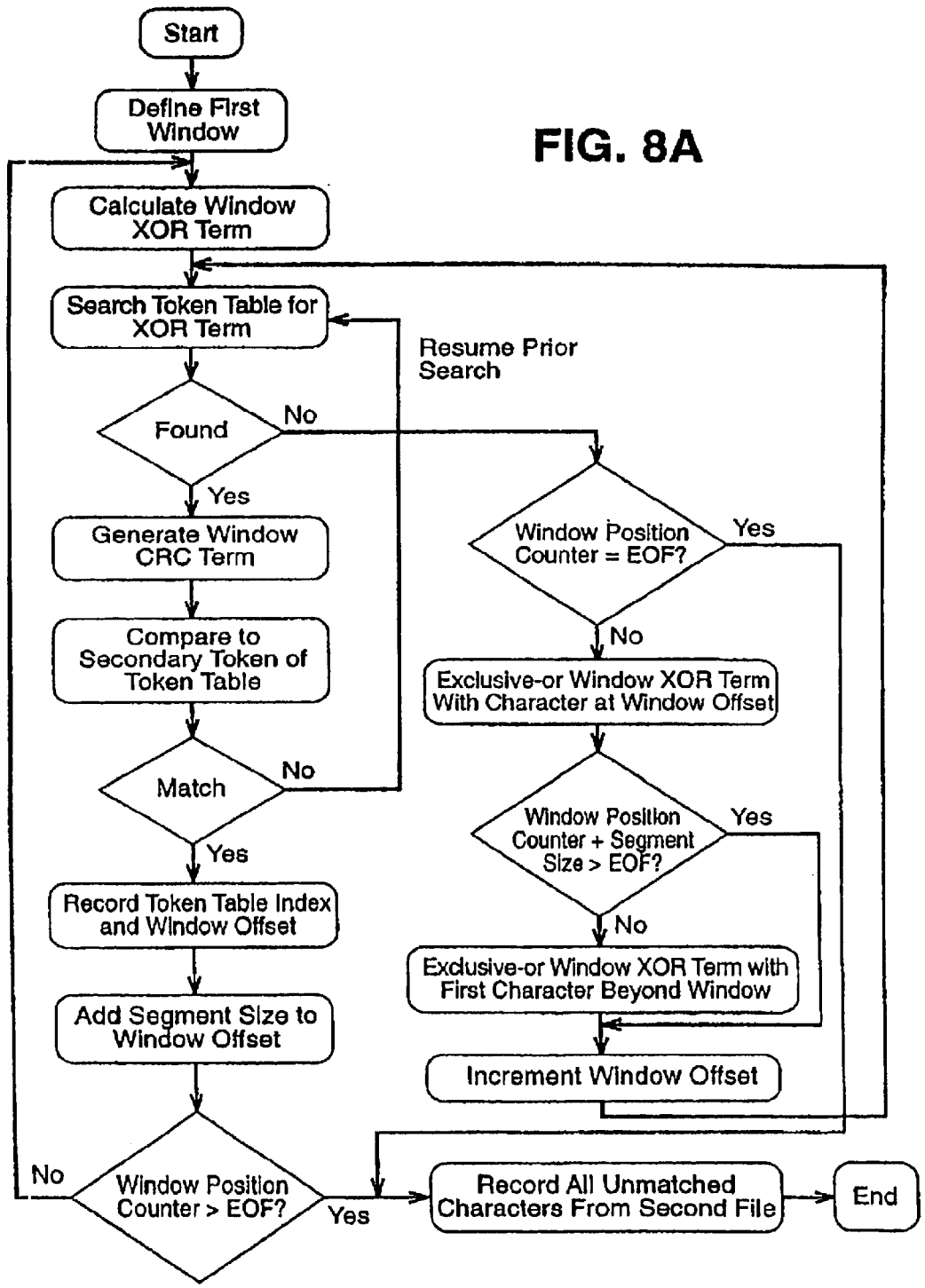
FIG. 8A is a somewhat more detailed flow chart of the method shown in FIG. 8.

FIG. 8A is a somewhat more detailed flow chart of the operation of the second program.

As an example of a file deletion, consider that the only change to the earlier file involved deletion of the word "a". The updated file would now read: "This is test file.". When the second program is actuated to generate the MATCH Table, it would find that the mathematical products for the first segments match and proceed as above. However, it would find that those of the second segments ("is a" and "is te") do not match. Nor would it find a match on bumping the segment window through the rest the updated file, thus no offset of the updated file ordinal number of the first character of an identical segment would be recorded in the MATCH Table, only the index "1" would be recorded. Then the program would return to look for matches of the third earlier file segment in the updated file. Of course here matches would obtain on the segments "test", and the index "2" and the offset "8" duly recorded in the MATCH Table. On scrolling through the MATCH Table, the third program would note that the offset "8" for the updated program segment matching the third segment in the earlier program was less than a full segment size (5) from the previous one, and thereupon copy the current-file information after the last matching segment and before the matching segment, into the TRANSITION Table. The fourth program, in creating an updated version of the original program, too would notice the nearness of the offsets and use that as its clue to substitute the TRANSITION Table information for that in the earlier file segment.

Figure 9:
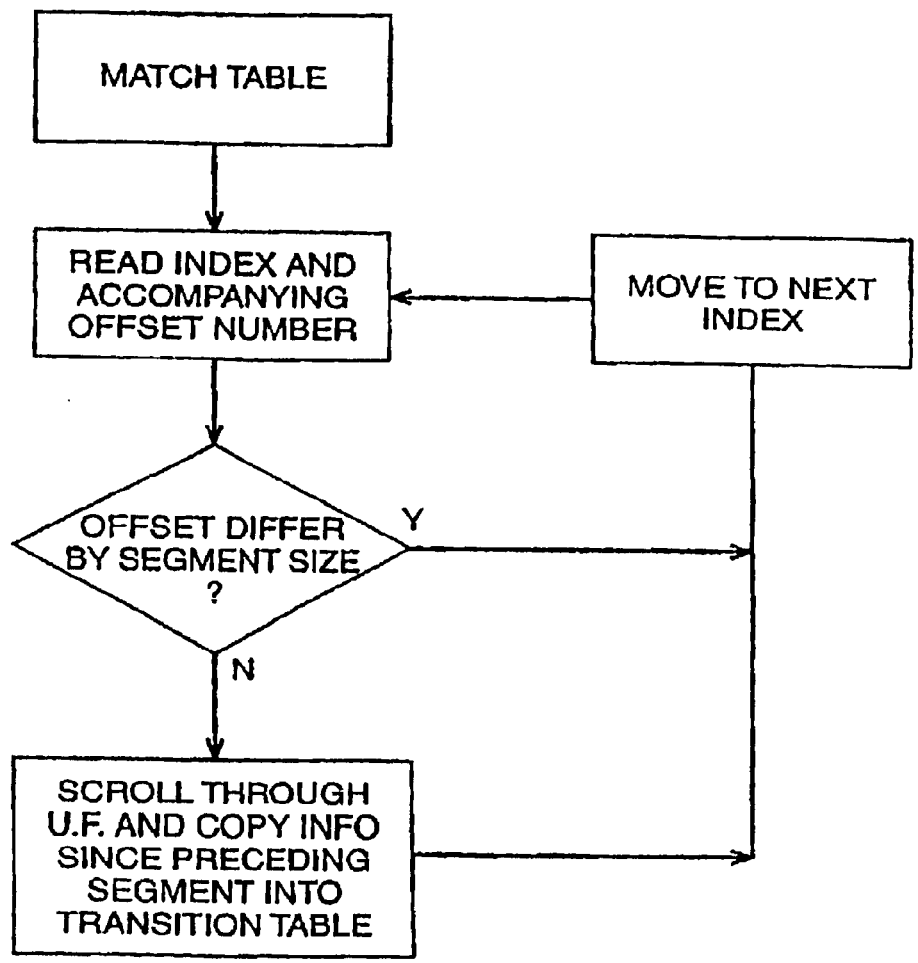
FIG. 9 is a flow chart setting forth the method of the third or TRANSITION Table generating program.

A flow chart detailing the operation of the third program is set forth in FIG. 9. The MATCH Table is read for index and offset information, the offset number compared with zero or that of the previous index, and if the difference is the segment size, advances to read the next index in the MATCH Table. If the difference was other than the segment size, it scrolls through the updated file to copy information since the preceding segment into the TRANSITION Table.

Figure 9A:
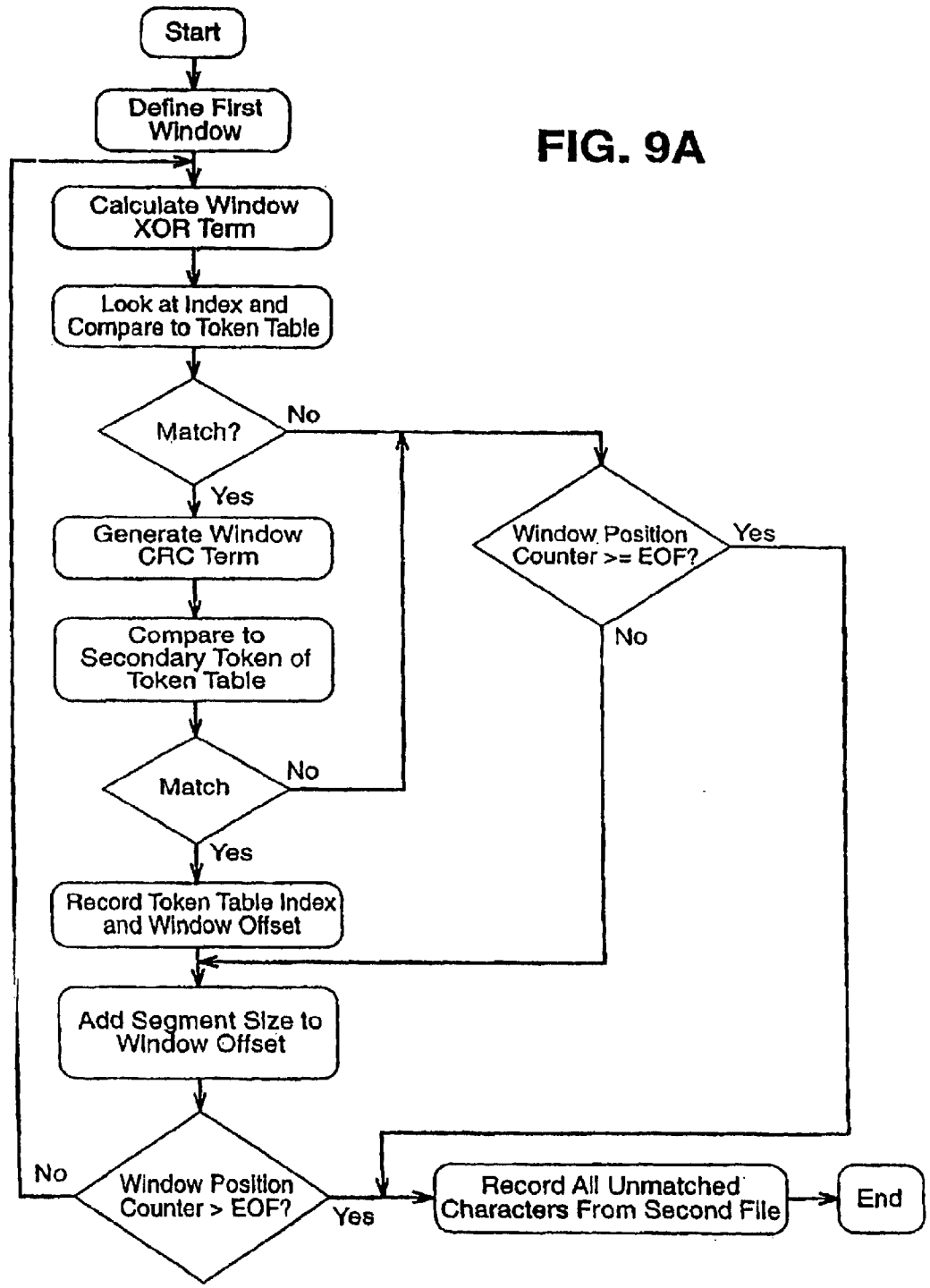
FIG. 9A shows an obvious variation of the method shown in FIG. 8A.

As an obvious variation, the second program can create the TRANSITION Table directly without the need for the third program by copying, when a mismatch between the mathematical representation for the segment in the earlier file EF and the mathematical representation for the segment window for the updated file is obtained, the character which has been bumped out of the window directly into the MATCH Table, thereby directly generating the TRANSITION Table. This is shown in the flow chart of FIG. 9A.

Figure 10:
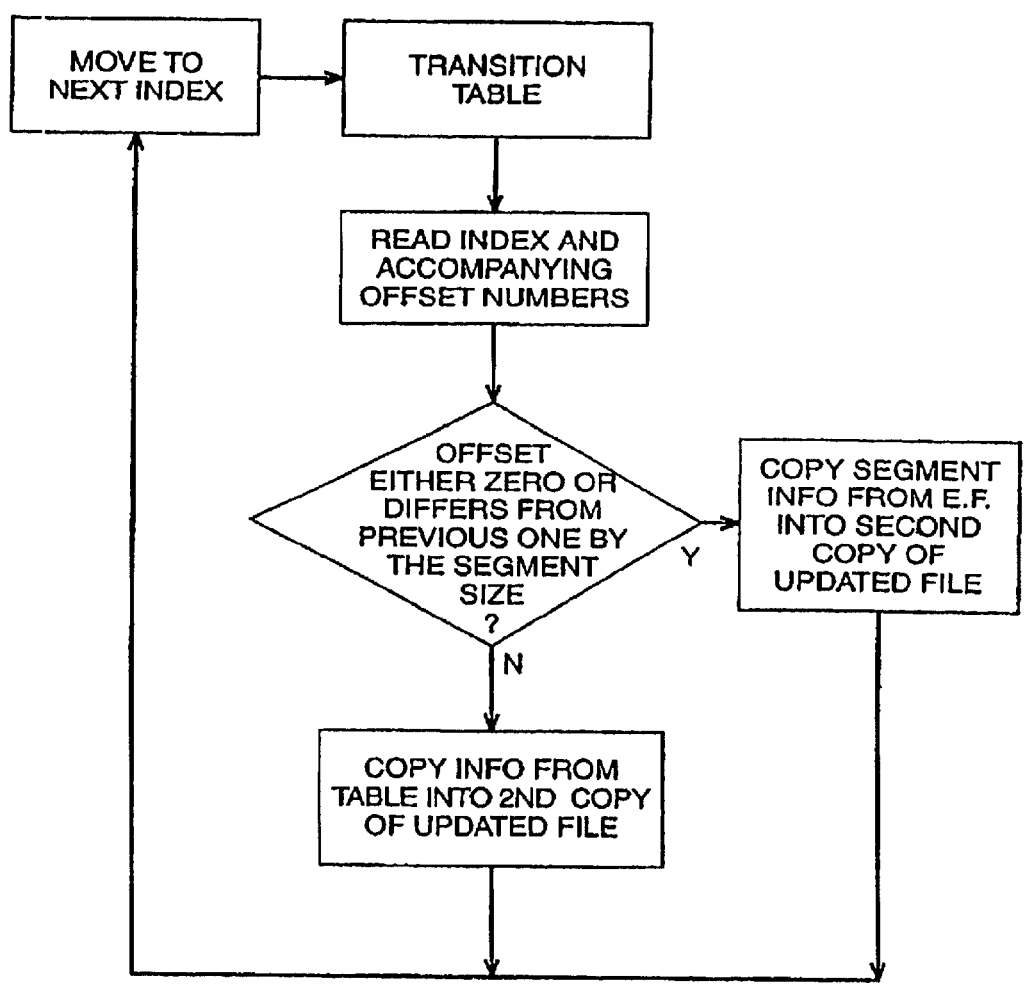
FIG. 10 is a flow chart setting forth the method of the fourth or reconstruction program.

A flow chart detailing the operation of the fourth program is set forth in FIG. 10. TRANSITION Table indices and their offset numbers are read and offset numbers checked for zero or for segment-size differences from the previous index. If it is the case, the index segment is copied from the earlier file into what is to be the second copy of the updated file. If it is not the case, information is copied from the TRANSITION file into what is to be the second copy.

An alternate format for the MATCH Table is set forth in FIG. 11. The format visualizes not listing individually successive identical segments, but rather merely indicating their number with the index for the first of such segments. Thus, with respect to the files of FIGS. 2 and 3, the second and fourth segments of the current file would not be listed; rather the indexes for the first and third segments would have associated with them under the column "Extent" the numeral "2" to indicate that two successive segments were identical in each case. This format has the advantage of being even more concise. It in effect maintains the segment count information as the index. It is more compact for large files, where an addition may contain nine or more bytes. Hence it requires less computer memory to support it.

Alternative embodiments of the TRANSITION Table may be employed. Thus, the TRANSITION Table may include other information, such as the segment size and supervisory error detection codes, and program version information.

Thus the TRANSITION Table may be written in any one of several base formats:

| | |
|---|---|
| index beginning (offset) | IB (FIG. 6) |
| index beginning (offset) count | IBC (FIG. 13) |
| index beginning (offset) end | IBE (FIG. 12). |

The IB format sets forth the index (ordinal number) of the successive identical segments and the offsets of their beginning characters. The IBC format sets forth the index of the first offset of a set of identical segments and the number (count) of such identical segments in the set. The IBE format sets forth the end character of each set of identical segments instead of the count. IBE format facilitates carrying end-of-file (EOF) information with it.

The IE format has been used exclusively for discussion in this document to avoid confusion.

The other formats, IBC and ABE are advantageous because they require less space than the IB format.

It will be evident that applicant has provided a method, means, and articles (signatures) for readily changing a secure file to reflect changes made in a copy of it elsewhere during an operating period such as a day. Applicant first creates a signature of the file the TOKEN Table; the signature is the index and a mathematical representation of each of the successive equal-sized segments of the file. Then the file is updated to reflect the transaction occurring during the course of the day. At the end of the day, the mathematical representations of successive window segments of the updated file are compared with those of the earlier file in the TOKEN Table, with the window segment for the updated file being bumped one character until either a match or end of file signal is detected where upon the next earlier file segment index is compared for A Match Table is created indicating the indexes (ordinal numbers) of the earlier file segments and the offsets (file character ordinal numbers) of the first characters of the identical updated-file segments. Next the updated file is scrolled through, and the non-matching information is copied from it, using the index numbers and offset numbers of the MATCH Table as a guide, into the TRANSITION Table. The TRANSITION Table may now be shipped to where a copy of the earlier file is, to update it according to the TRANSITION Table, by the fourth program.

As observed earlier, the programs of the invention can be incorporated in larger programs for handling large model files.

Certain files are immune to character insertions and deletions, these are large model files (LMF's). Nearly all commercial data bases create large model files. Large model files follow the following rules:

1) The file must be immune to character skewing. Data bas applications, which use records and fields obey this convention. Any change or update to a field or record will have no effect upon the location (offset) of any other record in the file.

2) If the file needs to grow in size to accomodate new records, additional records are appended to the end of the file. This format permits recycling of early file space as long as the character skewing rule is not violated.

A small model file (SMF) is any file which does not obey large model file (LMF) rules.

Thus under certain circumstances, it is possible to skip the windowing portion of this algorithm, thereby saving time and computer resources.

As a large model file example, consider an:

EF "This is a test file.", and a

CF "This is a test file. mom"

Large model file rule 1 is met: The file modification (change i to would not cause the bytes associated with any other file character to be effected. Each matching character is at the same byte offset in early file and current file. No character showing occurred.

Large model file rule 2 also is met: The additional infomation (mom) appeared at the end of the file.

For the purpose of this example, if more than 50% of a file matches under large model file rules, the small model file logic is to be omitted.

Considering further the above large model file,

| This_ | is_a_ | test_ | file. | |
|---|---|---|---|---|
| This_ | os_a_ | test_ | file. | _mom |
| match | nonmatch | match | match | nonmatch |

It can be seen that the first, third and fourth five-character match, and the second and fifth don't. Thus the statistics are that three segments match, therefore more than 50% current file was matched by early file.

The MATCH Table Would be:

| | |
|---|---|
| 0 | 0 |
| 2 | 10 |
| 3 | 15 |

Figure 14:
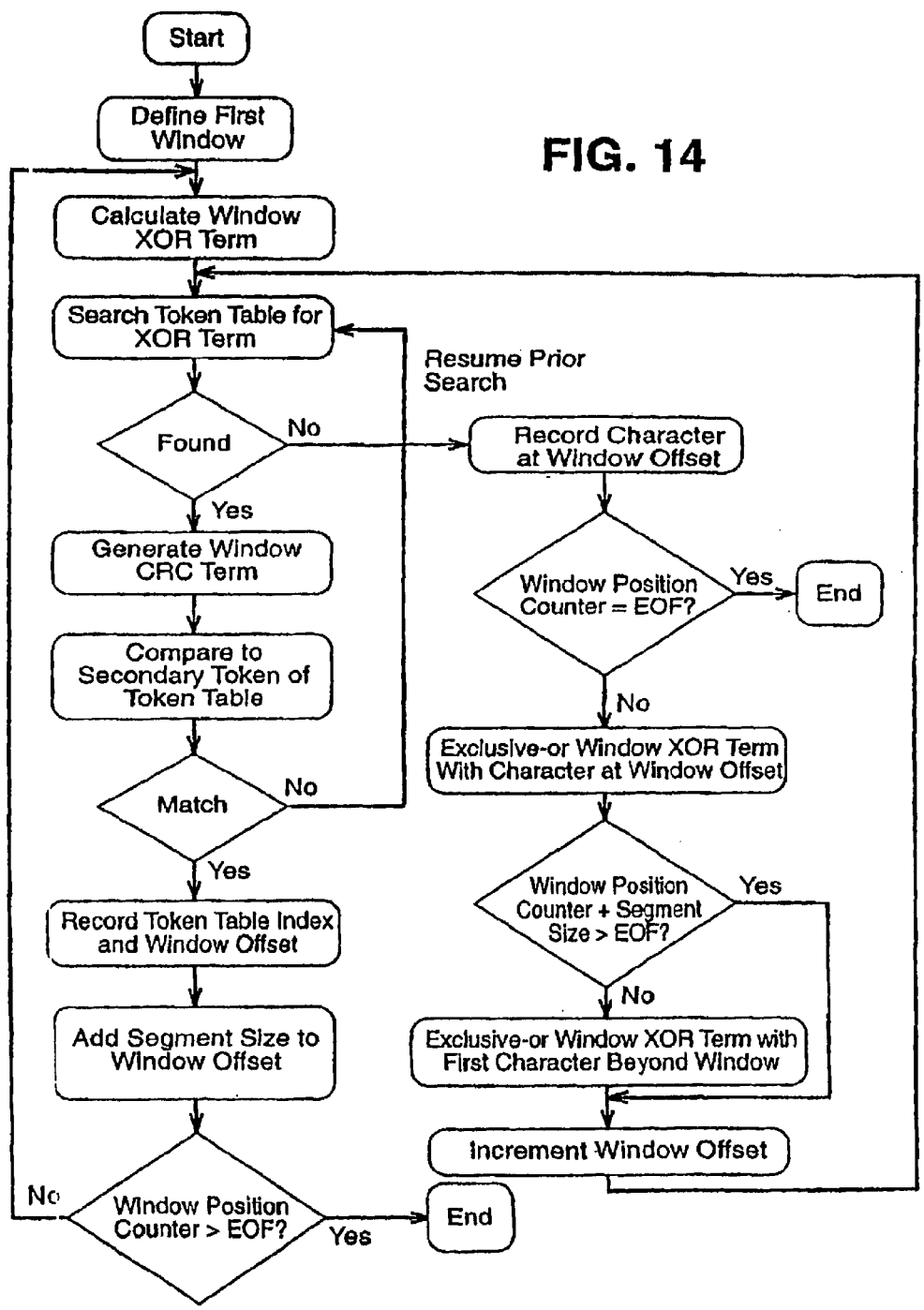
FIG. 14 is a flow chart of the program for creating the MATCH Table for large model files.

A flow chart of the program for creating the MATCH Table for large model files is provided in FIG. 14.

Therefore the TRANSITION Table should read:

| | | |
|---|---|---|
| 0 | 0 | |
| 2 | 10 | |
| 3 | 15 | \0 |
| os_a_ _mom | | |

Figure 15:
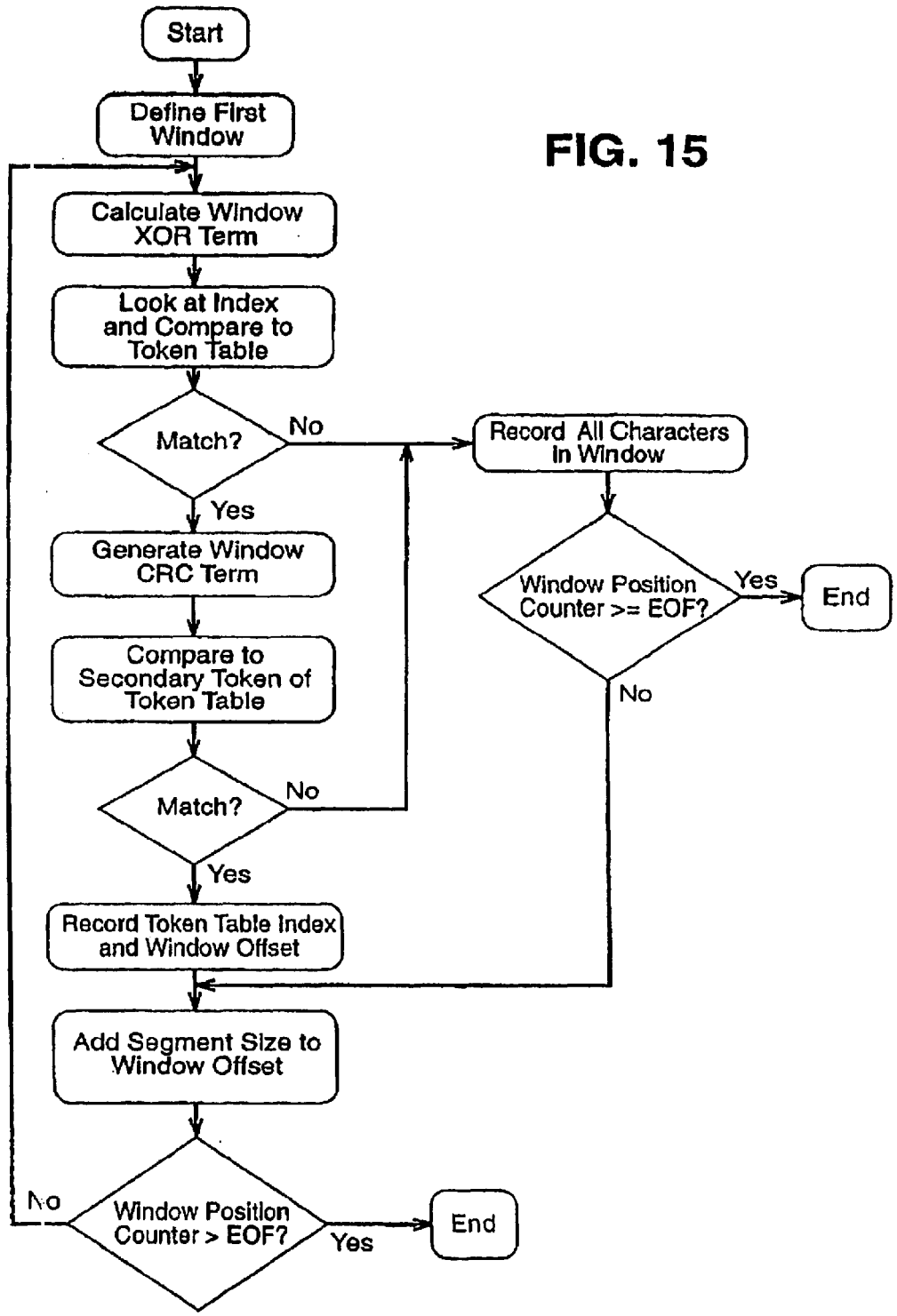
FIG. 15 is a flow chart of the steps for generating the TRANSITION Table for large model files without creating the intermediate MATCH Table.

As with small model files, the TRANSITION Table can be generated without having to generate the intermediate MATCH Table by recording segments which do not match directly into the MATCH Table. FIG. 15 is a flow chart of the steps for generating the TRANSITION Table for large model files without creating the intermediate MATCH Table.

This method of pretest, yields substantial runtime reductions on large model files. The windowing technique cannot yield superior results on files which follow large model file rules, it is therefor unnecessary to attempt to resolve such a large model file using the small model file windowing technique.

The larger program employs a two pass technique to efficiently process both large model files and small model files, it is unnecessary to employ the small model files windowing technique.

The first pass assumes that the file is a large model file. Each corresponding file segment from the TOKEN Table is compared to the corresponding current file segment. Comparison statistics are maintained. If more than a user specified percentage of the file matches using large model file rules, (or large model files rules were given at runtime) the small model file resolution logic is shipped, thereby saving considerable computer resources and time.

If the first pass comparison yields sufficiently poor results, or small model file rules were invoked at runtime, the small model file logic is invoked and the file is processed normally.

In addition to the above another computer back-up application, the invention lends itself to other applications. One such application is a media distribution application. A data vendor may maintain a large data base, say of sales tax rates for various cities and states, which is periodically updated. A mail order business may be a user of such a data base in order to charge the correct sales tax on each of its various order fulfillments. The data base maintainer would initially send the mail order business the complete data base. He would also generate a TOKEN Table of the data base as it then existed, using the first program. Upon updating his data base, he would develop a MATCH Table and a TRANSITION Table, using the second and third programs, and he would transmit the TRANSITION Table to the user. The user would update his data base, using the fourth program. The process would be repeated for subsequent updates.

In another application, the invention is used to harmonize files being independently updated at two different locations. Each location would generate a TRANSITION Table to reflect its changes, using the second and third programs, and send the Transition Table to the other location. The receiving location would then use the fourth program with the other's TRANSITION Table to update its file with the other locations changes.

In an archive maintenance application, a data base is continuously modified, say daily, and it is desired to maintain a complete daily archive. Initially, the data base as it exists at the start, would be copied onto the storage media and a TOKEN Table developed using the first program. At the end of the first day, a TRANSITION Table would be developed, using the second and third programs and copied onto the storage media having the original data base; also a new TOKEN Table would be created. At the end of the second day, a new TRANSITION Table would be developed and copied onto the storage media; also a new TOKEN Table. By continuing this daily process, a complete archive can be maintained on significantly less media than would normally be required, and the data base can be restored, using the fourth program, as it existed on any given day.

Another application involves a WORM Work File Maintenance System. (A WORM is a Write Only Read Many storage device.) Such a system may include a Server having a computer and a normal read/write/erase disk drive (DASD) and a WORM, Several other computers are connected to the computer server through a high speed network. At the end of the first day, all data from the other computers is copied onto the DASD. At the end of the second day, the data on the other computers is compared to the data on the DASD to generate the TRANSITION Table which is copied on the WORM. The data from the other computers is copied onto the DASD, either directly or by updating, to replace that of the previous day. On the third day, the process of the second day is repeated, except for the new TRANSITION Table being added to the TRANSITION Table already on the WORM. The fourth and further days essentially involve repeats of the third day. The data as it existed on a given day can be reconstructed by working backwards from the current data on the DASD and the TRANSITION Tables on the WORM. Thus all history is maintained, and no additional supporting backup is required for the discrete and physically separate computers.

The invention also is useful in word processing applications. Instead of full copies of the updated versions, only TRANSITION Table need be maintained. The initial version of a document is stored as is on a backup device. A TRANSITION Table is developed for the first updated version and stored on the backup device too. A TRANSITION Table is developed for the next updated version, reflecting the differences between it and the previous updated version, and it too is added to the back-up-device. The backup device thus holds the original version of the document and TRANSITION Tables reflecting subsequent documents in a minimum of storage space, and any version of the document can be recreated.

From a consideration of the above, it is evident that it is not a requirement of the invention that the early file be retained. This invention was adopted to facilitate the description of the invention. Kindly consider the below application which reverses the role of early file and current file, allowing the early file to be created from the current file and the TRANSITION Table.

In a word processor application, it is the intent of the user to maintain a logical path back to every revision of a work, while retaining only the current file and the TRANSITION Table.

Assume that the author is working on the fifth generation of the work and has the fourth saved locally. The author generates a TOKEN Table for 5(5.h) and compares it to 4. The TRANSITION Table created is in a "reverse" sense. Restated, the fifth generation plug the TRANSITION Table equals the fourth generation. The author can recover the fourth generation of the document by applying the T54 file to the current file (CF) to recover early file (EF). The earlier fourth 4 can now be erased.

In this example, the invention does not require the present availability of the early file.

A printout listing of the computer program embodying the invention follows. It consists of the Terac.exe modules in object code in hexadecimal representation and the Terac Supervisory lynx.ksh module in UNIX Script representation, and the caret.exe modules in object code in hexadecimal representation.

While there has been disclosed preferred embodiments of the invention, it will be appreciated that other embodiments embodying principles of the invention can be created boy those skilled in the art without departing from the spirit or wording of the appended claims.

What is claimed is:

1. A combination comprising a storage device, a file stored in said storage device, and a token table stored in said storage device, said token table comprising first and second different hashing mathematical representations for each of a plurality of fixed equal length character segments of said file.

2. A combination according to claim 1, wherein said first hashing representation of each of said segments is an exclusive-or representation of said respective one of said segments of equal character lengths.

3. A combination according to claim 1 wherein each of said segments is comprised of a plurality of sets and said exclusive-or representation is a representation that is a concatenation of an exclusive-or representation of at least a first of said plurality of sets with an exclusive-or representation of at least a second of said plurality of sets.

4. A combination according to claim 1, wherein the segments comprise successive sets of characters and are indexed for identification.

5. A combination as claimed in claim 1, wherein the first mathematical representation comprises an exclusive-or signature term of each segment of said file, each segment comprising sets and the exclusive-or signature term comprising the exclusive-or product of at least a first of said sets concatenated with the exclusive-or product of at least a second of said sets.

6. A combination according to claim 1, wherein the second mathematical representation for each of said segments comprises a cyclic redundancy check product of the characters of the respective segment of the file.

7. A combination according to claim 1, wherein the second mathematical representation for each of said segments comprises an order sensitive hash representation of the characters of the respective segments of said file.

8. A computer apparatus comprising a storage device, a file stored in said storage device, means for generating a token table having a signature of said file and storing said token table in said storage device, said means for generating and storing said token table comprising means for generating first and second different hashing mathematical representations for each of a plurality of fixed equal length character segments of said file.

9. An apparatus according to claim 8, wherein the means for generating said first and second different hashing mathematical representations comprises means for generating the first hashing mathematical representation for each of said segments, said first hashing mathematical representation comprising an exclusive-or representation of said respective one of said segments of equal character length.

10. An apparatus according to claim 8, wherein the segments comprise successive sets of characters and are indexed for identification.

11. An apparatus according to claim 8, wherein the means for generating the first and second different hashing mathematical representations comprises means for generating the second hashing mathematical representation comprising an exclusive-or signature of the characters of the respective segments of the file, each segment comprising sets and the exclusive-or signature of a respective segment comprising the exclusive-or product of at least a first of said sets concatenated with the exclusive-or product of at least a second of said sets.

12. An apparatus according to claim 8, wherein the means for generating the first and second different hashing mathematical representations comprises means for generating the second hashing mathematical representation comprising an order sensitive cyclic redundancy check product of the characters of the respective segments of said file.

13. An apparatus according to claim 8 wherein the means for generating the first and second hashing mathematical representations comprises means for generating a first hashing mathematical representation that is an exclusive-or representation and a second hashing mathematical representation that is an order sensitive hash term of the characters of the respective segments.

14. A method for generating a file signature, in a computer having a memory with a file therein and data processing means for producing a signature of said file, said method comprising generating and maintaining a record of first and second different hashing mathematical representations for each of a plurality of fixed equal length character segments of said file.

15. A method according to claim 14, wherein the step of generating said first and second mathematical representations comprises generating the first representation comprising an exclusive-or representation of said segments of said file.

16. A method according to claim 14, wherein the segments cover successive sets of characters, comprising indexing said sets for identification.

17. A method according to claim 14, wherein the step of generating the first and second mathematical representations comprises generating the first representation comprising an exclusive-or signature for each of said plurality of segments of said file, each segment comprising sets and the exclusive-or signature of a respective segment comprising the exclusive-or product of at least a first of said sets concatenated with the exclusive-or product of at least a second of said sets.

18. A method according to claim 14, wherein the step of generating the first and second mathematical representations comprises generating a second mathematical representation comprising a cyclic redundancy check product of the characters of the respective segments.

19. A method according to claim 14, wherein the step of generating said first and second mathematical representations comprises generating a second mathematical representation comprising an order sensitive hash representation of the characters of the segments.

20. The method of claim 14 further comprising generating a second signature for storage in the memory of differences between said first file and a second file, each of said first and second files having successive segments of characters, comprising a first step of generating, using the data processing means, offsets, each of said offsets representing a distance from a reference point, consisting of a fixed position in both of said first and second data files, of character segments in the second file which are identical to character segments in the first file, said distance from said reference point being the distance of a fixed character position within each respective segment from said reference point.

21. A method according to claim 20, further comprising generating said successive segments which are of equal size and indexing them by ordinal numbers.

22. A method according to claim 20, wherein each segment has a first character, said same position within each respective segment is the position of said first character of each segment and a second step comprises generating offsets which each identify the ordinal number counted from said reference point in the first file of the first character in a character segment in the second file which is identical to a character segment in the first file.

23. A combination comprising a memory, a signature and a first data file stored in said memory, said signature indicating a difference between said first data file and a second data file with respect to one another, said first and second data files each having successive segments of an equal number of characters and having a reference point at the same character position in both of said first and second data files, said signature comprising a plurality of offsets for said second data file, each offset representing the distance from said reference point in said second data file of a respective segment of said successive segments in said second data file, which is identical to one of said segments in said first data file, the distance from said reference point being the distance of a fixed character position within each respective segment from said reference point.

24. A combination according to claim 23, wherein said segments are indexed in said signature for identifying said segments.

25. A combination according to claim 23, wherein each segment has a first character and each offset indicates the ordinal number counted from said reference point in said second data file of the first character in a character segment in said second data file which is identical to one of said character segments in said first data file.

26. A computer apparatus having a memory with first and second files stored therein, said files each having successive segments of characters, comprising data processing means for generating first and second different hashing mathematical representations for each of a plurality of fixed equal length character segments of said files, means for comparing said hashing mathematical representations of said segments of said files to identify identical character sequences of said files, means for generating a file signature of portions of said files that are different, and means for generating offsets indicating a displacement, from a reference point, of character segments in said second file which are identical to character segments in said first file.

27. An apparatus according to claim 26, comprising means for generating said successive equal sized segments in said files and means for indexing said segments.

28. An apparatus according to claim 26, wherein each segment has a first character and said means for generating offsets generates offsets which each indicate the offset, from said reference point, of said first character of a character segment in said second data file which is identical to a respective character segment in said first data file.

29. A method of creating, from a first file having fixed length segments of characters and a difference file signature both stored in a computer having a memory and data processing means, a copy of a second file having fixed length segments of characters, said difference file signature indicating similarities and differences between said first file and said second file, an original of said second file having been created before the creation of said difference file signature, said method comprising generating a mathematical representation for each of said segments of the first file to uniquely identify each respective segment, and generating a mathematical representation for each of said segments of the second file to identify each respective segment in the second file, and creating in said difference file signature a record of representations of segments in the original of said second file that are identical to representations of segments in the first file and of the location or offsets of identical segments in the second file, and also storing in the record information which is different in the second file, the offset of said information which is different in said second file being derived from the offsets of identical segments in both said first and second files.

30. A method according to claim 29, wherein a second computer has a memory having a copy of the first file and a data processing means, said method comprising writing in the memory of the second computer said copy of the second file, using said difference file signature and said copy of the first file in the memory of the second computer to recompose the second file.

31. A method according to claim 30 for recomposing said second file, comprising writing a copy of the second file in the memory of the second computer by using said first file in said second computer as a source from which to read segments which are identical in said first and second files in said first computer and using the difference file as a source from which to read characters that are not common to said first and second files.

32. A method according to claim 30, comprising storing copies of the first file at separate locations and one of said copies which is at a first location is, continually and independently of the other, modified thereat to create a second file, and said copy of the second file is created at a second location using said copy of the first file at the second location and said record.

33. A method according to claim 29 wherein each segment has a first character and the record identifies identical segments by the indexes of said segments in said first file and by the offsets of the first characters of identical segments in the second file.

34. A method according to claim 29, wherein the first file is a maintained data base created from the record maintained in memory protected from ordinary user intervention and the second file is a user file, comprising updating the second file.

35. A method for creating a second window segment token from a base window segment token, said method comprising creating a base window segment in a computer memory by reading a segment of a file in a computer memory, said segment in said file being of the same size as said base window segment, calculating an exclusive-or signature that is an exclusive-or representation of the characters of said base window segment of the file to create a base window segment token, creating said second window segment which comprises all characters of said base window segment except the first character of said base window segment and comprises the next character in said file after said segment in said file which was read to form the base window segment by reading said next character in said file, and creating a second window segment token for said second window segment by adjusting the base window segment token to reflect the deletion of the first character of said base window segment and the addition of said next character in said file in forming the second window segment.

36. A storage device having a first file and a signature stored in said storage device, said signature representing differences of said first file with respect to a second file, said signature comprising offsets indicating a displacement of identical fixed length segments in said second file from the location of said segments in the first file.

37. A storage device according to claim 36, wherein the files have extents of successive segments in said second file which are identical to successive segments in said first file, and said signature includes representations of the extents of successive segments which are identical in both files.

38. A method of periodically maintaining, in a computer having a read/write storage device and data processing means, an archival record of a first version of a file and periodic changes to the first version of the file, the file being at least periodically updated in the read/write storage device, comprising periodically generating, using the data processing means, exclusive-or mathematical representations and order sensitive hash products of fixed length segments of the file, and creating a record in the read/write storage device of those representations and hash products that are identical to representations and hash products of segments in the file at the end of previous periods of said periodical updating, said record further comprising segments in the original version of the file that are different from said segments at the end of said previous periods of said periodical updating.

39. A method according to claim 38, comprising storing each periodically created record in the read/write storage device, and permanently storing the first version of the file and each of the records in the read/write storage device.

40. A method according to claim 39, comprising modifying said archival record to make said periodic changes with a word processor program, and the file is a word processing document.

41. A method according to claim 39 in which the computer also has a write once, read many times device comprising storing a copy of the first version of the file and the records in said write once, read many times device for a permanent archival record.

42. A method according to claim 39, wherein a copy of the first version of the file is stored in the read/write storage device, and comprising creating a copy on the read/write storage device of the file as it existed at the time one of said records was created by using the records up to that time and the first version of the file and the data processing means.

43. A method for producing a copy of a second file that is an updated version of an original file in a storage device, comprising producing a token set from each of the original file and an updated version of said original file, comparing the token sets of the original file and said updated version of said original file to identify the offsets of character segments in the updated version of said original file which are identical to character segments in said original file, thereby also identifying information in said updated version of said original file which is unmatched in said original file, each token set comprising first and second different mathematical representations of each segment of said original file and of each segment of said updated version of said original file.

44. The method of claim 43 wherein a residue comprising said unmatched information remains following said step of comparing, and further comprising combining said residue with said identical character segments in said original file and said updated version of said original file, to produce a difference signature file.

45. The method of claim 43 further comprising generating a difference signature file, in which differences between the original file and the updated version of the original file are recorded from a residue of said comparison, said residue corresponding to segments of the files that do not compare, and producing said copy of said second file from said difference signature file and a copy of said original file.

46. The method of claim 45 further comprising transmitting said difference signature file to a second storage device at a remote location for said step of producing said copy of said second file at said remote location, whereby the provision of only said original file at said remote location is necessary.

47. A method for producing a first file representative of differences between second and third files, comprising generating first and second hash tables from successive equal length segments of each of said second and third files by generating successive first and second different mathematical representations of equal length segments of said second and third files, respectively, wherein a segment is a set of successive characters, comparing said first and second hash tables, with respect to said second and third files, to identify segments of said second and third files that match one another, and producing said first file by listing segments of said second and third files that match one another.

48. The method of claim 47 wherein said comparison of said first and second hash tables identifies a residue corresponding to segments of said second and third files that do not compare, said method further comprising adding said residue to said first file.

49. The method of claim 47 wherein said step of comparing comprises successively comparing said first and second mathematical representations of said segments of said second and third files.

50. The method of claim 47 wherein said step of generating said first representations comprises generating exclusive-or representations of successive equal length segments of said second and third files.

51. The method of claim 47 wherein said step of generating said second representations comprises generating order sensitive hash representations of successive equal length segments of said second and third files.

52. A method for producing a token table from a computer data file in a memory media, the method comprising, for each of a plurality of fixed length segments in the data file, the steps of:
   (a) generating a first hashing representation for the segment;
   (b) generating a second hashing representation for the segment; and
   (c) concatenating said first and second hashing representations into a segment representation.

53. The method of claim 52 further comprising, for each of said plurality of fixed length segments, the steps of
   (d) reading a respective fixed length segment of said data file into said memory media before generating said first hashing representation; and
   (e) recording said segment representation in said memory media; and repeating steps (a)–(e) for each of said plurality of fixed length segments until all of said segments in said data file have been read and the token table contains one segment representation for each segment in said data file.

54. The method of claim 52 wherein said plurality of segments are nonoverlapping.

55. The method of claim 54 wherein said plurality of segments are consecutive.

56. The method of claim 52 wherein said first hashing representation is an exclusive-or representation and said second hashing representation is a non-exclusive-or representation.

57. The method of claim 56 comprising generating said exclusive-or representation by
   (a) calculating the exclusive-or product of each character in the segment;
   (b) dividing the segment into equal length subsets;
   (c) generating an exclusive-or product for at least one of said subsets of the segment; and
   (d) concatenating the exclusive-or product for at least one of said subsets with the exclusive-or product of each character in the segment to form said exclusive-or representation.

58. The method of claim 56 wherein said non-exclusive-or hashing representation is a cyclic redundancy check product.

59. A method for producing a token table from a computer data file in a memory media, the method comprising, for each of a plurality of fixed length segments in the data file, the steps of:
   (a) generating a first hashing representation for the segment using a first algorithm; and
   (b) generating a second hashing representation for the segment using a different algorithm from said first algorithm,
said first and second hashing representations together comprising a segment representation for each segment.

60. A token table in a memory medium comprising first and second different hashing representations of each of at least two nonoverlapping, fixed equal length segments in a file in said computer.

61. The token table of claim 60 wherein said first and second different hashing representations for at least one of said segments are concatenated as a single segment representation in said token table.

62. The token table of claim 60 wherein said file comprises text and said length of said segments is independent of the length of sentences in said text.

63. The method of claim 35 wherein said computer memory contains a second file, the method further comprising:
   calculating a second exclusive-or signature for a segment in the second file;
   after calculating said first exclusive-or signature for said base window segment and said second exclusive-or signature for said segment in the second file, comparing said first and second exclusive-or signatures;
   if said first and second exclusive-or signatures match, calculating a first non-exclusive-or hashing representation of said base window segment and calculating a second non-exclusive-or hashing representation of the segment in the second file to verify whether both said base window segment and the segment in the second file match; and
   creating said second window segment from said base window segment and creating said second window segment token from said base window segment token only if said first and second exclusive-or signatures do not match and said first and second non-exclusive-or hashing representations do not match.

64. A method for storing different versions of a computer file having a plurality of fixed length segments in a first memory media associated with a data processor, comprising the steps of:

(1) generating a token table in said first memory media, said token table comprising two hashing representations for each of said plurality of fixed length segments of a first version of said computer file,
   (2) generating a record of differences between the first version of said computer file and a second version of said computer file using said token table, and
   (3) storing said record in a second memory media.

65. The method of claim 64 wherein said first memory media is in a node of a network and said second memory media is in a server in said network.

66. A method according to claim 20, further comprising identifying character segments in the second file which are identical to character segments in the first file by generating third hashing mathematical representations for character segments in the second file and comparing the third representations with the first hashing mathematical representations for the character segments in the first file.

67. A method according to claim 66, wherein the steps of generating first hashing mathematical representations for character segments in the first file and generating third hashing mathematical representations for character segments in the second file comprise generating exclusive-or representations of the segments in the respective files.

68. A method according to claim 66, further comprising, for each character segment in the second file for which the third representation matches at least one first representation, generating a fourth mathematical representation for the character segment in the second file and comparing the fourth representation with the second representation for the character segment in the first file having the at least one first representation.

69. A method according to claim 68, wherein the steps of generating second hashing mathematical representations for character segments in the first file and generating the fourth mathematical representation for the character segment in the second file comprise generating cyclic redundancy check products of the characters of the respective segments in the respective files.

70. An apparatus according to claim 26, wherein the means for comparing said hashing mathematical representations of said segments of said files comprises means for first comparing for each segment the first representation of the segment in the first file with at least one first representation of at least one segment in the second file, and, if the first representation of the segment in the first file matches a first representation of a given segment in the second file, comparing the second representation for the segment in the first file with the second representation for the given segment in the second file.

71. A method according to claim 35, wherein the step of adjusting the base segment window token comprises exclusive-oring said first character of said base window segment and said next character in said file with said base segment widow token.

72. A method according to claim 38, wherein the step of creating a record comprises comparing exclusive-or representations of segments in the file with exclusive-or representations of segments of an earlier version of the file, and comparing order sensitive hash products of only those segments in the file whose exclusive-or representations match exclusive-or representations of segments of the earlier version of the file with order sensitive hash products of the matching segments of the earlier version of the file.

73. The method of claim 43 wherein the step of comparing the token sets of the original file and the updated versions comprises comparing the first representations of segments of the original file and updated version and comparing the second representations only for segments of the original file and updated version having identical first representations.

74. The method of claim 47 wherein the step of producing said first file further comprises listing offsets of segments in said third file which match segments in said second file, wherein said offsets indicate a displacement of the matching segments in the third file from a reference point in the third file.

75. A method for producing a token table from a computer data file in a memory media, the method comprising, for each of a plurality of fixed length segments in the data file, the steps of:
 (a) generating a first hashing representation for the segment;
 (b) generating a second hashing representation for the segment; and
 (c) associating the first representation with the second representation in the token table.

76. The method of claim 75 comprising storing in the token table indexes identifying the segments and wherein the step of associating comprises associating the first and second representations with the respective index for the respective segment.

77. The combination according to claim 1 wherein each of said first representations and each of said second representations are associated with one and only one of the segments in said file.

78. The combination according to claim 1 wherein said first and second hashing mathematical representations are generated for each segment from the characters in the segment.

79. The method of claim 14 wherein the step of generating the record of first and second different hashing mathematical representations comprises generating one and only one first and second representation for each segment.

80. The method of claim 14 wherein the step of generating the record of first and second different hashing mathematical representations comprises generating the first and second representations for each segment from the characters in the segment.

* * * * *